(12) United States Patent
Strogov et al.

(10) Patent No.: US 11,416,612 B2
(45) Date of Patent: Aug. 16, 2022

(54) PROTECTING AGAINST MALWARE CODE INJECTIONS IN TRUSTED PROCESSES

(71) Applicant: Acronis International GmbH, Schaffhausen (CH)

(72) Inventors: Vladimir Strogov, Moscow (RU); Serguei Beloussov, Costa del Sol (SG); Alexey Dod, Moscow (RU); Valery Chernyakovsky, Moscow (RU); Anatoly Stupak, Moscow (RU); Sergey Ulasen, Moscow (RU); Nikolay Grebennikov, Moscow (RU); Vyacheslav Levchenko, Moscow (RU); Stanislav Protasov, Moscow (RU)

(73) Assignee: Acronis International GmbH, Schaffhausen (CH)

( * ) Notice: Subject to any disclaimer, the term of this patent is extended or adjusted under 35 U.S.C. 154(b) by 661 days.

(21) Appl. No.: 16/354,612

(22) Filed: Mar. 15, 2019

(65) Prior Publication Data

US 2019/0286821 A1 Sep. 19, 2019

Related U.S. Application Data

(60) Provisional application No. 62/643,809, filed on Mar. 16, 2018.

(51) Int. Cl.
*G06F 21/56* (2013.01)
*G06F 21/52* (2013.01)
*G06N 20/00* (2019.01)

(52) U.S. Cl.
CPC ............ *G06F 21/566* (2013.01); *G06F 21/52* (2013.01); *G06F 21/568* (2013.01); *G06N 20/00* (2019.01); *G06F 2221/033* (2013.01)

(58) Field of Classification Search
CPC ...... G06F 21/566; G06F 21/52; G06F 21/568; G06F 2221/033; G06N 20/00; G06N 20/20
See application file for complete search history.

(56) References Cited

U.S. PATENT DOCUMENTS

| | | | |
|---|---|---|---|
| 2008/0010526 A1* | 1/2008 | Modani | G06F 11/36 714/30 |
| 2016/0180090 A1* | 6/2016 | Dalcher | G06F 21/554 726/23 |
| 2016/0378979 A1* | 12/2016 | Kapoor | G06F 21/85 726/23 |
| 2018/0324195 A1* | 11/2018 | Gupta | H04L 63/145 |
| 2018/0351968 A1* | 12/2018 | MacLeod | G06F 21/566 |
| 2019/0286821 A1* | 9/2019 | Strogov | G06N 20/20 |

* cited by examiner

*Primary Examiner* — Ali S Abyaneh
(74) *Attorney, Agent, or Firm* — ArentFox Schiff LLP; Michael Fainberg

(57) ABSTRACT

Disclosed are systems and methods for detecting malicious applications. The described techniques detect a first process has been launched on a computing device, and monitor at least one thread associated with the first process using one or more control points of the first process. An execution stack associated with the one or more control points of the first process is received from the first process. In response to detecting activity on the one or more control points of the first process, an indication that the execution of the first process is malicious is generated by applying a machine learning classifier to the received execution stack associated with the one or more control points of the first process.

15 Claims, 4 Drawing Sheets

PROTECTING AGAINST MALWARE CODE INJECTIONS IN TRUSTED PROCESSES

CROSS-REFERENCE TO RELATED APPLICATIONS

This application claims the benefit of U.S. Provisional Application No. 62/643,809, filed Mar. 16, 2018, which is herein incorporated by reference.

FIELD OF TECHNOLOGY

The present disclosure relates generally to the field of computer security, more specifically, to systems and methods of protecting against malware code injections in trusted processes using machine learning.

BACKGROUND

Malicious software, also referred to as "malware," can infiltrate or damage a computer system by corrupting software code, resulting in abnormal operation or even termination of applications and the operating system. Usually, malware can be recognized by analyzing the processes running on a system, and suspicious processes are recognized and blocked by security systems. However, conventional malware detection techniques have several drawbacks. Static analysis techniques involve scanning software code to identify suspicious commands and to compare the code with known characteristic properties of other viruses from an antivirus database. However, static analysis may be ineffective in situations where the active malware has been significantly modified or obfuscated from previous known versions, or in situations where the active malware has not been previously analyzed or even seen before, as is the case with zero-day attacks. Dynamic analysis techniques involve executing suspicious software code in a monitored, virtual environment, such as in a virtual machine. However, dynamic analysis techniques may be vulnerable to anti-emulation tricks embedded in the malware specifically designed to thwart analysis in the virtual environment. Examples of such anti-emulation tricks include the use of undocumented or uncommon Application Programming Interfaces (APIs), or the loading of a library for the operating system which is not emulated, which generally result in the failure of the emulator (e.g., virtual machine).

In another approach, one of the conventional signs by which a process is qualified as dangerous or safe/trusted is the presence or absence of a valid digital signature (e.g., generated by a trusted party). At the same time, processes that do not have such a digital signature may be considered suspicious and are monitored by security systems (e.g., they are blocked, place on a blacklist, etc.) However, there is a danger that a malicious process may run inside any known trusted process. As a result, a process that has access to user data and to a functioning system appears to be injected, that is, essentially infected with malicious code that, when access user data, corrupts or even encrypts them (e.g., ransomware). In this case, the usual protection systems and anti-virus programs may not be able to detect the danger, so the problem of protection from "injected" has been deemed more complex than the definition of independent malicious processes.

SUMMARY

Accordingly, aspects of the present disclosure provide a driver (file protector) and a machine learning (ML) engine configured to protect against malware code injections into trusted processes, such as shared-service processes. Whenever any new process is started in the system, the driver constantly monitors all threads in the process. Call stack trace (or execution stack trace) monitoring may be performed using several control points (i.e., detectors), which are associated with certain events or activities, such as creating a file, deleting file, creating thread, etc. The file protector driver may receive an execution stack for the specified control points. In the case of any activity on this checkpoint (e.g., the thread tries to rename, open, or delete a file), the driver sends the stack to the ML engine, which gives a probabilistic estimate of the danger of this thread. Depending on the selected or preset parameters, the result of the evaluation may be used for further actions. For example, the initial version of the modified (deleted) file can be restored from a backup or from suspended suspicious transaction. At the same time, the stack may be sent to a remote server for further analysis and study, the result of which are added to the ML engine heuristics database and then used to more accurately identify suspicious and malicious processes and programs.

In one aspect, a computer-implemented method for detecting a malicious application is provided. The method includes detecting a first process has been launched on a computing device, and monitoring at least one thread associated with the first process using one or more control points of the first process. The method further includes receiving from the first process an execution stack associated with the one or more control points of the first process, and responsive to detecting activity on the one or more control points of the first process, generating an indication that the execution of the first process is malicious by applying a machine learning classifier to the received execution stack associated with the one or more control points of the first process.

In another aspect, the monitoring the at least one thread associated with the first process is performed using call stack trace monitoring.

In another aspect, detecting the first process has launched and the monitoring the at least one thread associated with the first process is performed by a file protector driver module.

In another aspect, the one or more control points are associated with events comprising at least one of: create a file, cleanup a file, close a file, duplicate a handle, rename a file, delete a file, and create a thread.

In another aspect, the one or more control points are associated with a system call to create a remote thread that runs in a virtual address space of a second process.

In another aspect, the second process includes a shared-service process configured to import third-party processes to be embedded in the second process as separate threads.

In another aspect, the method further includes, responsive to receiving the indication that the execution of the first process is malicious, performing a remedial action comprising restoration of a file modified by the first process and termination of the first process.

In another aspect of the present disclosure, a system for detecting a malicious application is provided that includes a memory device, and a processor coupled to the memory device. The processor is configured to detect a first process has been launched on a computing device, and monitor at least one thread associated with the first process using one or more control points of the first process. The processor is further configured to receive from the first process an execution stack associated with the one or more control points of the first process, and responsive to detecting activity on the one or more control points of the first process, generate an indication that the execution of the first process is malicious by applying a machine learning classifier to the received execution stack associated with the one or more control points of the first process.

According to another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for detecting a malicious application. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
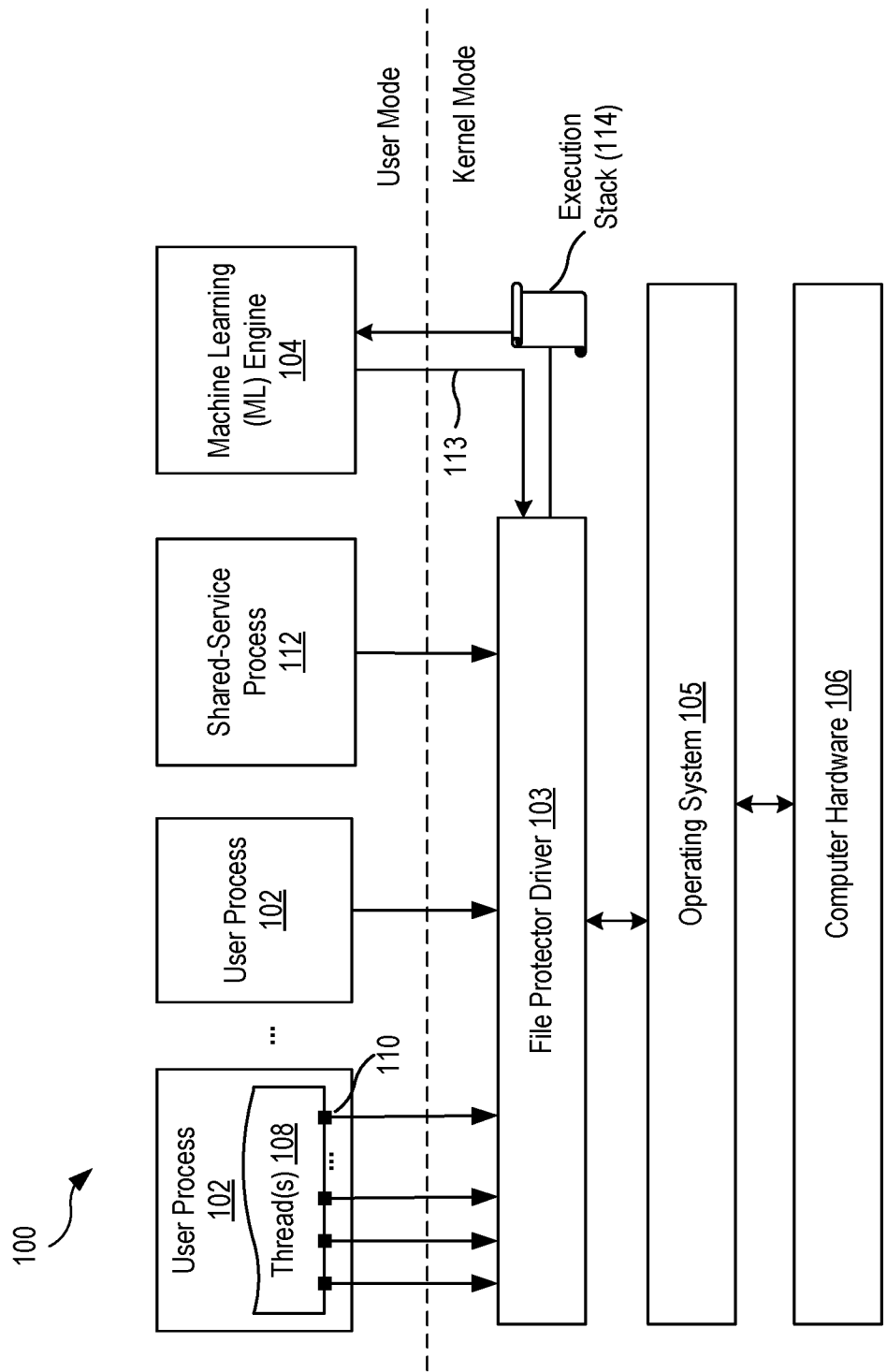
FIG. 1 is a block diagram illustrating a system for detecting a malicious application, according to an exemplary aspect.

FIG. 1 is a block diagram illustrating a system 100 for detecting a malicious application according to an exemplary aspect. The system 100 includes computer hardware 106 that supports execution of one or more user-level processes 102 or OS thread processes executing in an operating system (OS) environment provided by an operating system 105. Each user process 102 may be associated with a user application (i.e., the user process 102 may be part of the user application, or be considered an instance of the user application itself). In some cases, the user application may in fact be a malicious application (i.e., malware) configured to infiltrate the operating system 105 or damage the system 100 by corrupting software code, resulting in abnormal operation or termination of applications and the operating system 105, or unauthorized modification of user data on the system 100.

The system 100 further supports execution of at least one shared-service process 112 in parallel with the user processes 102. A shared-service process refers to a specialized process configured to be shared by a plurality of services to resource consumption of the computing hardware 106 (as grouping multiple services into a single process can conserve resources). In some aspects, the shared-service process 112 may be configured to allow third-party programs or processes to be embedded in the shared-service process as separate threads. In some aspects, services running in the shared-service process can be implemented as dynamically-linked libraries (DLLs) imported into the main process. One example of a shared-service process 112 is a Service Host process (also referred to as "SvcHost" or "svchost.exe"), found on Windows® operating systems and configured to host internal Windows services and other services. As the shared-service process 112 is typically a known process used for hosting internal services of the operating system 105, the shared-service process 112 can often be characterized as a "trusted" or "safe" process in terms of computer security. However, some malicious applications (i.e., "malware") may exploit such main processes that allow third-party programs or processes to be embedded in the main process as separate threads, as shown in FIGS. 2A and 2B.

Figure 2A:
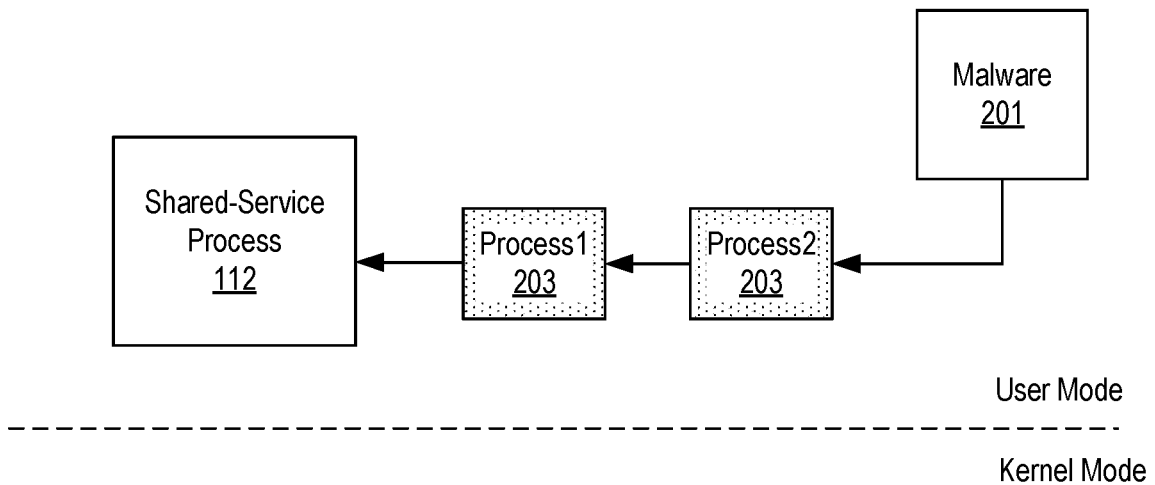
FIGS. 2A and 2B are block diagrams illustrating operations of a malicious process to inject its processes into a shared-service process.
Figure 2B:
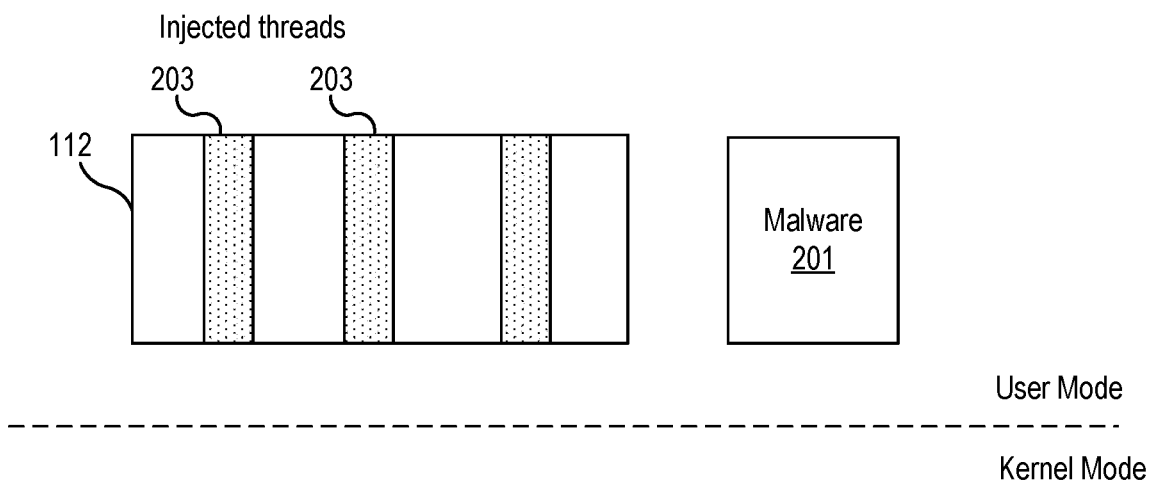

FIGS. 2A and 2B are block diagrams illustrating operations of a malicious application 201 to inject its processes into a shared-service process 112. As shown in FIG. 2A, the malicious application 201 executing on the system 100 may launch one or more processes 203 ("Process1", "Process2"). The processes 203 may contain instructions for maliciously altering operation of the system 100, instructions for transferring control of a processor to another process that contains the malicious behavior, or other instructions that facilitate the behavior of the malicious application 201.

The malware application 201 may then allocate space within the address space of the shared-service process. For example, the malware application 201 may invoke a system call of the operating system 105 that changes a state of a region of memory within the virtual address space of a specified process. In aspects using a Windows-based system, the malware application 201 may call a memory management function (e.g., "VirtualAllocEx( )") to allocate a region within the virtual address space of the shared-service process 112, using such as parameters as a handle to the shared-service process 112, a pointer to some region within the shared-service process 112, and a size of the malicious process 203.

After that, the malware application 201 writes one or more processes 203 including the execution state (e.g., execution stack) and other data related to the process 203. In one aspect, the malware application 201 may use a system call configured to write data to an area of memory in a specified process, such as "WriteProcessMemory( )" or "WriteVirtualMemory( )" functions in a Windows-based system. As shown in FIG. 2B, the malware application 201 may then invoke a thread inside the process 112, for example, using a createRemoteThread( ) function configured to create a thread that runs in the virtual address space of another thread. As a result, the shared-service process is injected with one or more malicious threads corresponding to the malicious processes.

Referring back to FIG. 1, the system 100 includes a driver module, referred to as a file protector driver 103, and a machine learning (ML) engine 104 configured to detect and prevent the injection of such code into trusted processes, such as the shared-service process 112. In some aspects, the file protector driver 103 may be configured to monitor the operations of one or more user processes 102 executing in the system, including any threads part thereof, and flag any activity that may modify user data (i.e., files) or execution state of other processes (e.g., shared-service process 112, other user processes 102).

The ML engine 104 may be configured to analyze the execution state and behavior of the monitored user processes (e.g., as captured by their respective execution stacks) using machine learning techniques. For example, the ML engine 104 may include a heuristics database or one or more models trained on previous execution stacks and configured to probabilistically identify user processes and threads that may be malicious based on their execution state. In one aspect, the ML engine 104 may be configured to perform an ensemble learning method for classifying the execution state and behavior of monitored user processes by using a plurality of decision trees (constructed at training time) that output a classification that is the mode of the classes output by the individual trees. In some implementations, the ML engine 104 may be configured to execute a "random forests" algorithm for classifying the execution state and behavior of the monitored user processes, a gradient boosted decision-tree based algorithm (e.g., LightBGM, XGBOOST), or other suitable ensemble learning methods.

In one aspect, the file protector driver 103 may be configured to detect whenever processes 102 have been launched on the system 100. Whenever any new processes have been started in the system, the file protector driver 103 may be configured to constantly monitor all threads 108 in those new processes. In some aspects, the file protector driver 103 may be configured to perform call stack trace (or execution stack trace) monitoring on one or more control points 110 of a thread. Under the approach provided by the present disclosure, the file protector driver is selected as the element to analyze at the point of execution of certain file operations and other operations that the file protector driver intercepts, thereby covering all sources of malicious threads, regardless of their origin, under the approach that the target of the operation matters rather than the source of the malicious thread.

In some aspects, the control points 110 on which call stack trace (or execution stack trace) monitoring is performed may be associated with the following events or activities of the process 102, including file creation, file cleanup, file close, handle deprecation, file renaming, file deletion, thread creation, writing to virtual memory, and other file-related or memory-related events. In some aspects, the control points may correspond to system calls exposed by the operating system 105 for performing the above-described events or activities, such as "CreateFile( )", "DeleteFile( )", "CreateThread( )", "CreateRemoteThread( )", and "WriteVirtualMemory( )". In an aspect, at least one of the control points 110 are associated with a system call (e.g., "CreateRemoteThread( )") to create a remote thread that runs in a virtual address space of another process, such as the shared-server process 112. The present disclosure may use terminology and system call names from a Windows-based environment, but it is understood that aspects of the present disclosure may be applied to other suitable operating systems having corresponding system calls.

In an aspect, the file protector driver 103 may be configured to receive (e.g., from the process 102) an execution stack 114 for a specified control point(s) 110. The execution stack 114 (also referred to as a call stack) is a data structure used by the operating system 105 to store and manage data values related to the execution state of the thread 108. In one aspect, the execution stack 114 is implemented as a stack-based data structure onto which a process (that is calling a sub-routine) "pushes" a data value indicating a return address onto the stack 114. When the sub-routine finishes execution, the sub-routine "pops" or pulls the return address off the execution stack and transfer control to the instructions at that return address. In an aspect, the execution stack 114 may include one or more stack frames containing local variable storage associated a routine of the thread 108, return addresses (e.g., frame pointer) back to a routine's caller, and parameter values passed to the routine. In some aspects, the execution stack 114 may be associated with a particular thread 108 of the process 102. In other aspects, the execution stack 114 may be for the entire process 102, which may include a plurality of threads 108 and their corresponding execution stacks. In one aspect, the plurality of values stored in the execution stack 114 at a given time (e.g., return addresses, parameters, local variables, etc.) provide an input data set that can be analyzed using machine learning to identify tendencies and patterns indicating of malicious software using attack vectors such as shared-service processes. Accordingly, aspects of the present disclosure are able to use stack-based classification which are suitable for unknown threats that inject malicious threads into trusted processes, which is a capability that traditional virus scanning is unable to provide.

In one aspect, in response to detecting activity on the one or more control points 110 of a process 102, the file protector driver 103 may be configured to generate an indication (113) that the execution of the process 102 is malicious by applying a machine learning classifier to the received execution stack 114. In an aspect, in case of any activity on a particular checkpoint, the file protector driver 103 may transmit the execution stack 114 to the ML engine 104. In turn, the ML engine 104 is configured to generate a probabilistic prediction of whether the process 102 is malicious based on the data values and properties contained in the execution stack 114. In some aspects, the ML engine 104 may use string values of the call stack frames as columns of data, to which a random forests decision tree algorithm or other suitable algorithm is applied. In an aspect, the indication 113 generated by the ML engine 104 may represent a probabilistic estimate of the danger of this thread. For example, the indication 113 may be a probability value ranging from 0 to 1, or any range of floating point numbers with a decision threshold. In other aspects, the indication 113 generated by the ML engine 104 may be a classification of the execution stack 114 corresponding to an enumerated set of values encompassing "malicious" or "safe" states.

In some aspects, the file protector driver 103 may be configured to perform one or more remedial actions based on the evaluation by the ML engine 104. For example, in response to an indication that the user process 102 is malicious, the file protector driver 103 may restore all modifications made by the injected threads that had been identified using control points (e.g., using a version stored in a backup), and the injected threads are terminated by the agents after their detection. Other "healthy" threads of the shared service process continue their execution, i.e., the system remains fully functional after this remedial action. In another example, in response to a generated indication that the user process 102 is malicious based on an execution stack associated with a control point for file deletion or file writes, the file protector driver 103 may restore an initial version of the deleted file from a backup, or even block the file deletion operation itself. In another example, in response to generated indication that the user process 102 is malicious based on an execution stack 114 associated with a control point for creating a remote thread, the file protector driver 103 may block importation of a dynamically linked library into the shared-service process 112 to prevent injection of malware into the shared-services process 112 (i.e., svchost.exe).

In some aspects, the file protector driver 103 may further transmit the stack to a remote server for further analysis and study. The result of such analysis and study may be incorporated back into the ML engine 104 to more accurately identify suspicious and malicious processes and programs. For example, the ML engine 104 may receive one or more updates to its heuristics database that modifies the ML engine 104 to generate improved predictions of whether subsequent execution stacks are classified as malicious activity.

In some aspects, the file protector driver 103 can be implemented as filesystem filter drivers, which are kernel-mode components that run as part of the operating system 105. Filesystem filter drivers may be configured to extend functionality of or modify the behavior of a file system. A filesystem filter driver can filter I/O operations for one or more file systems or file system volumes. An I/O operation in a file request can be processed by different filesystem filter drivers in a particular sequence (e.g., an order as defined by a storage stack of the operating system 105). In some aspects, the file protector driver 103 may be attached to one or more mounted volumes of a storage device in computer hardware 106 that has been designated (e.g., by an administrator) for protection from malware, and filters all I/O operations on them. In another aspect, the file protector driver 103 may be implemented as a software service or module executing on the operating system 105 as a client of a volume/disk filter manager that acts on its behalf within a filesystem filter driver.

In some aspects, the machine learning engine 104 may be implemented as a software service or module executing on the system 100. While depicted as local to the file protector driver 103, it is understood that the machine learning engine 104 may be implemented as a remote software service executing on another system (e.g., centralized service, third-party server, cloud-based service) and accessible by a network connection.

Figure 3:
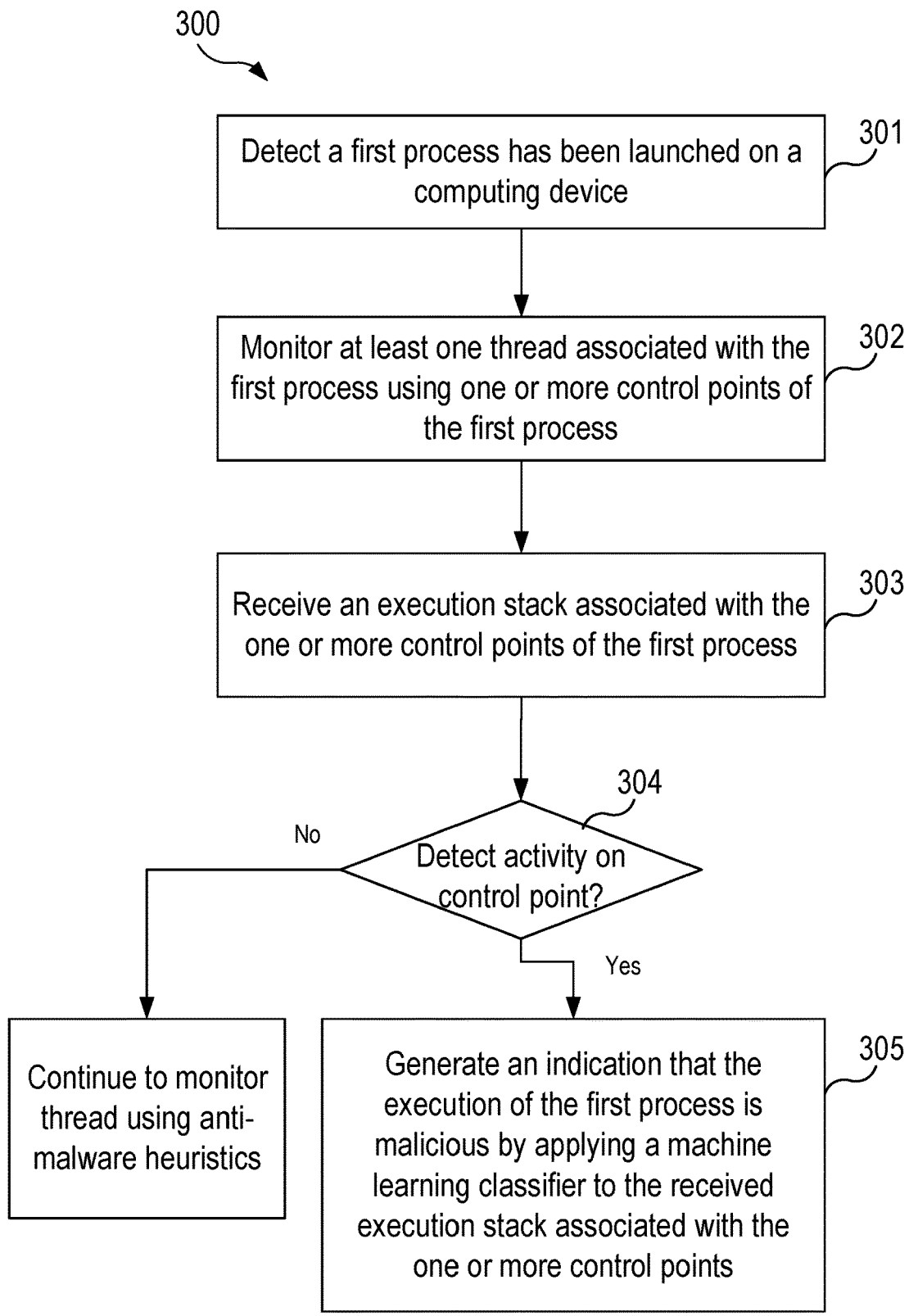
FIG. 3 is a flowchart illustrating a method for detecting malicious applications according to an exemplary aspect.

FIG. 3 is a flowchart illustrating a method 300 for detecting malicious applications according to an exemplary aspect. It is noted that the following description of the exemplary method makes reference to the system and components described above.

The method 300 begins at step 301, in which the file protector driver 103 detects a first process has been launched on a computing device. At step 302, the file protector driver 103 monitors at least one thread associated with the first process using one or more control points of the first process. In some aspects, the monitoring the at least one thread associated with the first process is performed using call stack trace monitoring. In some aspects, the one or more control points are associated with events comprising at least one of: create a file, clean up a file, close a file, duplicate a handle, rename a file, delete a file, and create a thread. In some aspects, the one or more control points are associated with a system call to create a remote thread that runs in a virtual address space of a second process. In some aspects, the second process comprises a shared-service process configured to import third-party processes to be embedded in the second process as separate threads.

At step 303, the file protector driver 103 receives from the first process an execution stack associated with the one or more control points of the first process. At step 304, the file protector driver 103 determines whether any activity has been detected on the one or more control points of the first process. If so, at step 305, the file protector driver 103 generates an indication that the execution of the first process is malicious by applying a machine learning classifier, by the machine learning engine 104, to the received execution stack associated with the one or more control points of the first process. In some aspects, the indication that the execution of the first process is malicious comprises a probabilistic prediction that the first process is malicious.

In some aspects, the file protector driver 103 may, responsive to receiving the indication that the execution of the first process is malicious, perform one or more remedial actions that protects against malicious actions by the first process. For example, the file protector driver 103 may perform a remedial action that includes restoration of a file modified by the first process and termination of the first process, and resumption of operation of the shared service process. In some aspects, after the checkpoint, the use of anti-ransomware or anti-malware heuristics may be used to continue monitoring the operations of the first process. Based on such heuristics' application to the thread, a decision may be made about the first process, and as a consequence, the threads may be terminated and the data that was modified by these threads can be restored.

Figure 4:
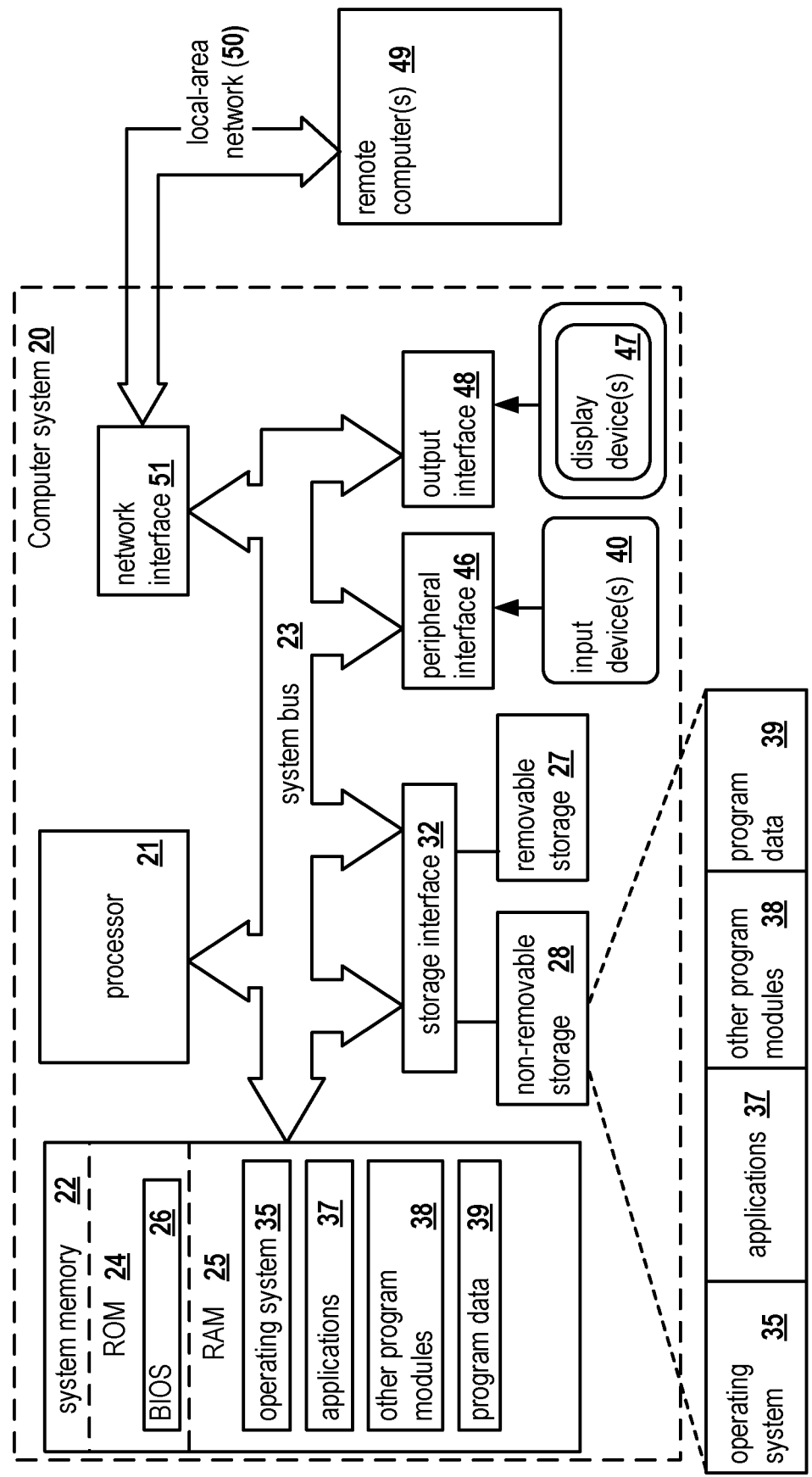
FIG. 4 is a block diagram of a computer system on which the disclosed system and method can be implemented according to an exemplary aspect.

FIG. 4 is a block diagram illustrating a computer system 20 on which aspects of systems and methods for detecting a malicious application may be implemented in accordance with an exemplary aspect. It should be noted that the computer system 20 can correspond to a system 100, for example, described earlier. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, static random access memory (SRAM), dynamic random access memory (DRAM), zero capacitor RAM, twin transistor RAM, enhanced dynamic random access memory (eDRAM), extended data output random access memory (EDO RAM), double data rate random access memory (DDR RAM), electrically erasable programmable read-only memory (EEPROM), NRAM, resistive random access memory (RRAM), silicon-oxide-nitride-silicon (SONOS) based memory, phase-change random access memory (PRAM); flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A computer-implemented method for detecting a malicious application, comprising:
    detecting a first process has been launched on a computing device;
    monitoring at least one thread associated with the first process using one or more control points of the first process;
    receiving from the first process an execution stack associated with the one or more control points of the first process; and
    responsive to detecting activity on the one or more control points of the first process, wherein the one or more control points are associated with a system call to create a remote thread that runs in a virtual address space of a second process, which is a shared-service process configured to import third-party processes to be embedded in the shared-service process as separate threads, generating an indication that the execution of the first process is malicious by applying a machine learning classifier to the received execution stack associated with the one or more control points of the first process.

2. The method of claim 1, wherein the monitoring the at least one thread associated with the first process is performed using call stack trace monitoring.

3. The method of claim 1, wherein the detecting the first process has launched and the monitoring the at least one thread associated with the first process is performed by a file protector driver module.

4. The method of claim 1, wherein the one or more control points are further associated with events comprising at least one of: create a file, clean up a file, close a file, duplicate a handle, rename a file, delete a file, and create a thread.

5. The method of claim 1, further comprising:
    responsive to receiving the indication that the execution of the first process is malicious, performing a remedial action comprising restoration of a file modified by the first process and termination of the first process.

6. A system for detecting a malicious application, comprising:
    a memory device; and
    a processor coupled to the memory device and configured to:
        detect a first process has been launched on a computing device;
        monitor at least one thread associated with the first process using one or more control points of the first process;
        receive from the first process an execution stack associated with the one or more control points of the first process; and
        responsive to detecting activity on the one or more control points of the first process, wherein the one or more control points are associated with a system call to create a remote thread that runs in a virtual address space of a second process, which is a shared-service process configured to import third-party processes to be embedded in the shared-service process as separate threads, generate an indication that the execution of the first process is malicious by applying a machine learning classifier to the received execution stack associated with the one or more control points of the first process.

7. The system of claim 6, wherein the monitoring the at least one thread associated with the first process is performed using call stack trace monitoring.

8. The system of claim 6, wherein the detecting the first process has launched and the monitoring the at least one thread associated with the first process is performed by a file protector driver module.

9. The system of claim 6, wherein the one or more control points are further associated with events comprising at least one of: create a file, clean up a file, close a file, duplicate a handle, rename a file, delete a file, and create a thread.

10. The system of claim 6, further comprising:
    responsive to receiving the indication that the execution of the first process is malicious, performing a remedial action comprising restoration of a file modified by the first process and termination of the first process.

11. A non-transitory computer readable medium comprising computer executable instructions for detecting a malicious application, including instructions for:
    detecting a first process has been launched on a computing device;
    monitoring at least one thread associated with the first process using one or more control points of the first process;

receiving from the first process an execution stack associated with the one or more control points of the first process; and responsive to detecting activity on the one or more control points of the first process, wherein the one or more control points are associated with a system call to create a remote thread that runs in a virtual address space of a second process, which is a shared-service process configured to import third-party processes to be embedded in the shared-service process as separate threads, generating an indication that the execution of the first process is malicious by applying a machine learning classifier to the received execution stack associated with the one or more control points of the first process.

12. The computer readable medium of claim 11, wherein the monitoring the at least one thread associated with the first process is performed using trace monitoring.

13. The computer readable medium of claim 11, wherein the detecting the first process has launched and the monitoring the at least one thread associated with the first process is performed by a file protector driver module.

14. The computer readable medium of claim 11, wherein the one or more control points are further associated with events comprising at least one of: create a file, clean up a file, close a file, duplicate a handle, rename a file, delete a file, and create a thread.

15. The computer readable medium of claim 11, further comprising:

responsive to receiving the indication that the execution of the first process is malicious, performing a remedial action comprising restoration of a file modified by the first process and termination of the first process.

* * * * *